(12) United States Patent
Liu et al.

(10) Patent No.: US 11,436,188 B2
(45) Date of Patent: Sep. 6, 2022

(54) RESOURCE OPTIMIZATION AND UPDATE METHOD, SERVER, AND DEVICE

(71) Applicant: ALIBABA GROUP HOLDING LIMITED, Grand Cayman (KY)

(72) Inventors: Zilong Liu, Hangzhou (CN); Liangliang Zhu, Hangzhou (CN); Xu Zeng, Hangzhou (CN); Lingjun Chen, Hangzhou (CN); Bin Wang, Hangzhou (CN); Junjie Cai, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/729,059

(22) Filed: Dec. 27, 2019

(65) Prior Publication Data

US 2020/0136988 A1    Apr. 30, 2020

Related U.S. Application Data

(63) Continuation of application No. PCT/CN2018/091960, filed on Jun. 20, 2018.

(30) Foreign Application Priority Data

Jun. 27, 2017    (CN) .......................... 201710502718.4

(51) Int. Cl.
*G06F 16/10* (2019.01)
*H04L 47/762* (2022.01)
(Continued)

(52) U.S. Cl.
CPC ............ *G06F 16/10* (2019.01); *H04L 47/762* (2013.01); *H04L 47/781* (2013.01); *H04L 47/788* (2013.01); *H04L 67/1097* (2013.01)

(58) Field of Classification Search
CPC ...... G06F 16/10; H04L 47/762; H04L 47/781
See application file for complete search history.

(56) References Cited

U.S. PATENT DOCUMENTS

2004/0039891 A1 * 2/2004 Leung ..................... G06F 16/10
711/165
2014/0165070 A1    6/2014 Persikov et al.

FOREIGN PATENT DOCUMENTS

CN    101763223 A    6/2010
CN    102479108 A    5/2012
(Continued)

OTHER PUBLICATIONS

International Search Report and Written Opinion issued by the International Searching Authority in related Application No. PCT/CN2018/091960, dated Sep. 25, 2018 (12 pgs.).
(Continued)

*Primary Examiner* — Kyung H Shin
(74) *Attorney, Agent, or Firm* — Finnegan, Henderson, Farabow, Garrett & Dunner, LLP

(57) ABSTRACT

Embodiments of the disclosure provide methods and systems for managing resources of a plurality of devices coupled to a server. The method can include acquiring statistical information of the resources of the plurality of devices; determining whether a trigger condition is met; and in response to the determination that trigger condition is met, generating a resource optimization solution for the plurality of devices based on the statistical information.

18 Claims, 5 Drawing Sheets

(51) Int. Cl.
*H04L 47/78* (2022.01)
*H04L 67/1097* (2022.01)

(56) References Cited

FOREIGN PATENT DOCUMENTS

| | | |
|---|---|---|
| CN | 102831045 A | 12/2012 |
| CN | 103186412 A | 7/2013 |
| CN | 103186412 A | 7/2013 |
| CN | 103530185 A | 1/2014 |
| CN | 104038392 A | 9/2014 |
| CN | 106101271 A | 11/2016 |
| CN | 106250232 A | 12/2016 |
| JP | 2011128706 A | 6/2011 |
| WO | WO 2019/001318 A1 | 1/2019 |

OTHER PUBLICATIONS

First Chinese Office Action issued in corresponding Chinese Application No. 201710502718.4 dated Aug. 27, 2021 (10 pages).

\* cited by examiner ns, and a
RESOURCE OPTIMIZATION AND UPDATE METHOD, SERVER, AND DEVICE

CROSS REFERENCE TO RELATED APPLICATION

The disclosure claims the benefits of priority to International application number PCT/CN2018/091960, filed Jun. 20, 2018 and Chinese application number 201710502718.4, filed Jun. 27, 2017, both of which are incorporated herein by reference in their entireties.

BACKGROUND

The Internet of Things (IoT) is an important part of the new generation of information technologies and an important stage of development in the "informatization" era. On the basis of the computer Internet, the IoT realizes automatic identification of items and interconnection and sharing of information through the computer Internet by using Radio Frequency Identification (RFID), wireless data communication, and other technologies.

However, an IoT system or a Real Time Operating System (RTOS) may have limited resources, among which, memory is particularly valuable. To save resources, it is usually necessary to optimize the task stack and dynamic memory used by a user. In conventional solutions for optimizing the task stack and dynamic memory, optimization estimation is generally performed by developers. Therefore, the optimization analysis efficiency is low, and it is difficult to guarantee accuracy of optimization estimation results, thus affecting the optimization effect.

In addition, it is also hard to identify occasional problems, such as stack overflows and memory overruns.

SUMMARY OF THE DISCLOSURE

In view of the above, the present invention provides an input method and apparatus, a device, a system, and a computer storage medium, for providing an input mode applicable to virtual reality technologies.

Embodiments of the disclosure provide a method for managing resources of a plurality of devices coupled to a server. The method can include: acquiring statistical information of the resources of the plurality of devices; determining whether a trigger condition is met; and in response to the determination that trigger condition is met, generating a resource optimization solution for the plurality of devices based on the statistical information.

Embodiments of the disclosure also provide a method for managing resources of a device. The method can include: acquiring statistical information of the device; and uploading the statistical information to a server, the server being configured to generate a resource optimization solution for managing the resources of the device based on the statistical information.

Embodiments of the disclosure further provide a server for managing resources of a plurality of devices coupled to the server. The server can include: a memory storing a set of instructions; and at least one processor configured to execute the set of instructions to cause the server to perform: acquiring statistical information of the resources of the plurality of devices; determining whether a trigger condition is met; and in response to the determination that trigger condition is met, generating a resource optimization solution for the plurality of devices based on the statistical information.

Embodiments of the disclosure further provide a device for managing resources of the device. The device can include: a memory storing a set of instructions; and at least one processor configured to execute the set of instructions to cause the device to perform: acquiring statistical information of the device; and uploading the statistical information to a server, the server being configured to generate a resource optimization solution for managing the resources of the device based on the statistical information.

Embodiments of the disclosure further provide a non-transitory computer readable medium that stores a set of instructions that is executable by at least one processor of a server to cause the server to perform a method for managing resources of a plurality of devices coupled to the server. The method can include: acquiring statistical information of the resources of the plurality of devices; determining whether a trigger condition is met; and in response to the determination that trigger condition is met, generating a resource optimization solution for the plurality of devices based on the statistical information.

Embodiments of the disclosure further provide a non-transitory computer readable medium that stores a set of instructions that is executable by at least one processor of a computing device to cause the computing device to perform a method for managing resources of the computing device. The method can include: acquiring statistical information of the device; and uploading the statistical information to a server, the server being configured to generate a resource optimization solution for managing the resources of the device based on the statistical information.

It can be seen from the technical solutions above that the present invention determines and records the location information of the virtual surface in the three-dimensional space, detects, according to the location information of the input object and the location information of the virtual surface, whether the input object is in contact with the virtual surface, and determines the input content according to the recorded trajectory generated in the process when the input object is in contact with the virtual surface. The present invention realizes information input in a three-dimensional space and is applicable to virtual reality technologies, so that the input experience of users in virtual reality is like that in a real space.

DETAILED DESCRIPTION

To make the objectives, technical solutions and advantages of the disclosure clearer, the present invention will be described in detail below with reference to the accompanying drawings and specific embodiments.

The terms used in embodiments of the disclosure are merely intended to describe particular embodiments, and are not intended to limit the present invention. The singular forms "a" and "the" used in the embodiments and the appended claims of the disclosure are also intended to include plural forms, unless other meanings are clearly indicated in the context.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Depending on the context, the word "if" as used herein may be interpreted as "at the time of" or "when" or "in response to determination" or "in response to detection." Similarly, depending on the context, the phrase "if determined" or "if detected (conditions or events stated)" can be interpreted as "when determined" or "in response to determination" or "when detected (conditions or events stated)" or "in response to detection (conditions or events stated)."

This application is described in further detail below with reference to the accompanying drawings and specific implementation manners such that the above objectives, features and advantages of this application can be more comprehensible.

Figure 1:
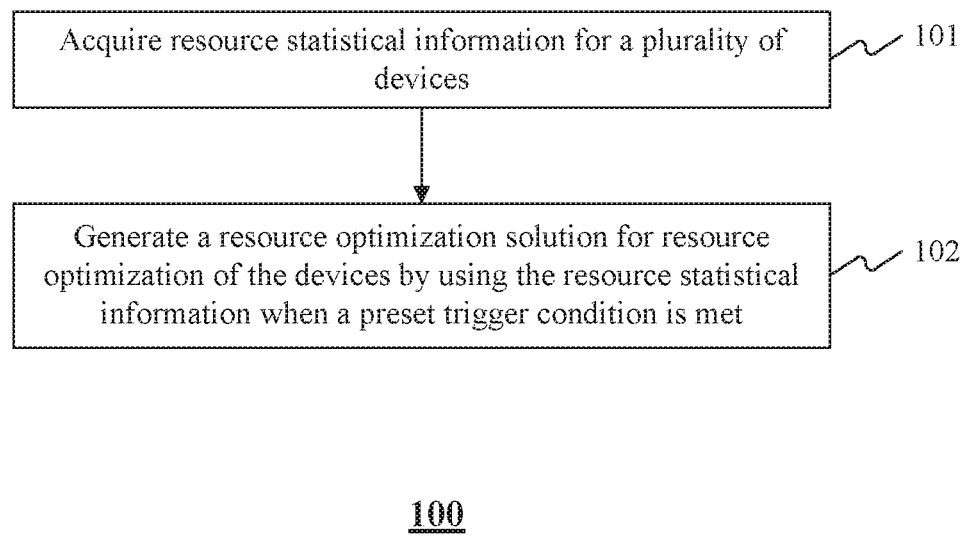
FIG. 1 is a flowchart of a resource optimization method, according to some embodiments of the disclosure.

FIG. 1 is a flowchart of a resource optimization method 100, according to some embodiments of the disclosure. Method 100 can be implemented by a computing device, e.g., a server connected with devices. The computing device can include a memory storing a set of instructions and at least one processor configured to execute the set of instructions to cause the computing device to perform method 100, and method 100 can include steps as follows.

In step 101, resource statistical information of a plurality of devices can be acquired. In some embodiments, the resource statistical information can be collected by the devices and sent to the server.

The devices can be installed with an RTOS, and the device uses the data processing capability provided by the RTOS to obtain the resource statistical information.

The plurality of devices can be used to collect resource statistical information. The resource statistical information can be beneficial for data diversity, provide a foundation of abundant data for subsequent resource optimization analysis, and improve the accuracy of resource optimization analysis.

A communication channel between each device and the server can be established, and the device can upload the resource statistical information to the server through the established communication channel. The communication channel can include, but is not limited to, a dedicated data acquisition channel.

The resource optimization can include size optimization of the storage space, overflow processing of the storage space, and the like. The resource statistical information can include storage space statistical information, storage space overflow statistical information, and the like.

The storage space can include a stack, a memory, and the like. The storage space statistical information can include stack statistical information, memory statistical information, and the like. The storage space overflow statistical information can include stack overflow statistical information and memory overrun statistical information. The stack statistical information can include a task name to which the stack belongs, a stack size, a size of a used space of the stack, a proportion of the remaining size or used size of the stack, a statistical information time, and the like. The memory statistical information can include a task name, a memory size, a size of a used space of the memory, a proportion of the remaining size or used size of the memory, a statistical information time, and the like. The stack overflow statistical information can include an identifier of a called stack, a task name to which the stack belongs, a start address of a task to which the stack belongs, a stack overflow address, a statistical information time, and the like.

The memory overrun statistical information can include a task name, a memory identifier to which the task name belongs, a related start address of a memory overrun, a statistical information time, and the like.

In some embodiments of the disclosure, device category information or attribute category information may be carried in the resource category information acquired by the server.

The device category information can be used to reflect the category of the device, and can include a model of the device, a version number of the RTOS installed in the device, and the like.

The attribute category information can be used to reflect the category of the resource statistical information. Each type of resource statistical information has corresponding attribute category information, which can include a storage space detection category, a storage space overflow detection category, and the like. The storage space detection category corresponds to the detection of the storage space statistical information, and the storage space overflow detection category corresponds to the detection of the storage space overflow statistical information.

In practice, each type of attribute category information has a category identifier. For example, for stack statistical information, the corresponding attribute category information is a stack size detection category, and the category identifier is assumed to be 1. For the memory statistical information, the corresponding attribute category information is a memory size detection category, and the category identifier is assumed to be 2. For the stack overflow statistical information, the corresponding attribute category information is a stack overflow detection category, and the category identifier is assumed to be 3. For the memory overrun statistical information, the corresponding attribute category information is a memory overrun detection category, and the category identifier is assumed to be 4.

In step 102, a resource optimization solution for resource optimization of the devices is generated by using the resource statistical information when a preset trigger condition is met. To obtain a sufficient amount of data for data analysis, in some embodiments of the disclosure, a trigger condition may be set. When the data collected by the server side reaches the trigger condition, the data analysis is triggered. In some embodiments of the disclosure, the trigger condition can include one or more of the following situations.

(1) The quantity of the collected resource statistical information reaches a preset quantity threshold. For example, the trigger timing is reached when the quantity of resource statistical information received by the server is 1000 pieces.

(2) The size of the collected resource statistical information reaches a preset data size threshold. For example, the trigger timing is reached when the size of the resource statistical information received by the server is 100,000 bytes.

(3) The collection time for the collected resource statistical information reaches a time threshold. For example, the trigger timing is reached when the time of the resource statistical information received by the server is 10 hours.

In some embodiments of the disclosure, step 102 may include the following sub-steps.

In sub-step S11, resource statistical information belonging to a same device category information and a same attribute category information can be extracted when the preset trigger condition is met. In some embodiments of the disclosure, when the data collected by the server reaches the trigger condition, the server can classify the collected resource statistical information. In an example, the resource statistical information may be screened and classified according to the device category information and the attribute category information. For example, for the resource statistical information belonging to devices of a same device model and a same version number, the stack statistical information can be classified into one category, the memory statistical information is classified into one category, the stack overflow statistical information is classified into one category, and the memory overrun statistical information is classified into one category.

In sub-step S12, resource optimization analysis can be performed on the extracted resource statistical information to obtain an analysis result. In some embodiments of the disclosure, when the resource statistical information is the storage space statistical information, sub-step S12 may further include the following sub-steps.

In sub-step S121, among used space sizes of a same storage space for executing a same task and used space sizes associated with the same device category information, a maximum used space size can be determined based on the storage space statistical information.

In some embodiments, when the collected data reaches the trigger condition, the server can classify all the received resource statistical information according to device models and version numbers of the operating system into device categories, and obtain resource statistical information corresponding to each device category.

Then, the storage space statistical information can be screened out from the resource statistical information corresponding to each piece of device category information, as the storage space statistical information corresponding to each device category.

As an example, the storage space statistical information can include at least one of: a task name for identifying a task that occupies the storage space; a storage space size for indicating capacity of the storage space; and a used space size for indicating a maximum value of the storage space that has been used when a task is performed in the current device.

Because one or more devices may be included in one device category, the storage space statistical information corresponding to each device category can include storage space statistical information of one or more devices.

In step S121, if only one device is included in the device category, the used space size in the storage space statistical information of the device can be as the maximum value. If more than one device is included in the device category, the used space sizes in the storage space statistical information of the one or more devices can be compared, and the largest used space size can be taken as the maximum value, which is the maximum used space size of the device category for this storage space.

In sub-step S122, the maximum used space size of the storage space can be compared with the size of the storage space.

In sub-step S123, the size of the storage space can be adjusted according to the comparison result.

After the maximum used space size of the storage space of each device category is determined, the maximum used space size of the storage space of the device category can be compared with the storage space size of the storage space, and the size of the storage space is adjusted according to the comparison result.

In some embodiments of the disclosure, sub-step S123 may further include the following sub-steps: determining a ratio of the maximum used space size to the storage space size to obtain a maximum usage rate; if the maximum usage rate is less than a preset usage rate threshold, increasing the maximum usage rate by a preset redundancy usage rate to obtain an updated usage rate; and determining an updated storage space size based on the updated usage rate and the storage space size.

For example, if the maximum used space of the storage space of the device category is 60 megabytes (MB) and the size of the storage space is 100 MB, the corresponding maximum usage rate is $60/100=60\%$. If the preset usage rate threshold is 85%, the maximum usage rate can be increased by a preset redundancy usage rate (for example, 20%) in this case, and the updated usage rate can be obtained, that is, the updated usage rate is 60%+20%=80%. At this time, according to the storage space size 100 M and the updated usage rate 80%, the updated storage space size is 100 M*80%=80 M. That is, the storage space size is reduced from the original 100 M to 80 M. In other words, the storage space reduced to 80 M can meet the execution requirements of the current task without wasting the storage space.

In some embodiments, for the stack statistical information, if the proportion of the size of the unused stack in the stack statistical information of a device category is too large (that is, the maximum usage rate is less than the preset usage rate threshold), the stack may be optimized and decreased; otherwise, the size of the stack is increased. The obtained analysis result may be increasing or decreasing the size of the stack, and the amplitude of the increase or decrease. A reasonable stack size is obtained by increasing or decreasing the size of the stack according to the proportion.

For the memory statistical information, if the proportion of the size of the unused memory in the memory statistical information of a device category is too large (that is, the maximum usage rate is less than the preset usage rate threshold), the memory may be optimized and decreased; otherwise, the size of the memory is increased. The obtained analysis result may be increasing or decreasing the size of the memory, and the amplitude of the increase or decrease. A reasonable memory size is obtained by increasing or decreasing the size of the memory according to the proportion.

In some embodiments of the disclosure, when the resource statistical information is storage space overflow statistical information, sub-step S12 may further include the following sub-step.

In sub-step S124, based on the storage space overflow statistical information, a plurality of overflow space sizes associated with a same device category executing a same task can be acquired, and a maximum overflow space size can be determined among the plurality of overflow space sizes.

In some embodiments, when the collected data reaches the trigger condition, the server may classify the received resource statistical information according to at least one of the device model and the version of the operating system, and obtain resource statistical information corresponding to each device category. The device category is associated with the device model.

Then, the storage space overflow statistical information is screened out from the resource statistical information corresponding to each piece of device category information, as the storage space overflow statistical information corresponding to each device category. For example, the storage space overflow statistical information can include a task name, storage space to which it belongs, and a starting address of a storage space overflow. Because one or more devices may be included in one device category, the storage space overflow statistical information corresponding to each device category may include storage space overflow statistical information of the one or more devices.

In step S124, when a memory overflow is detected, the storage space overflow statistical information may be obtained from memory overflow context information. If one device is included in the device category, the overflow space size of the device is the overflow space size of the device category. If more than one device is included in the device category, a maximum overflow space is selected from overflow spaces of the more than one device.

In sub-step S125, the size of the storage space can be expanded according to the maximum overflow space. After the maximum overflow space of the device category is obtained, the storage space size of the storage space can be expanded based on the maximum overflow space. In some embodiments, the size of the expanded storage space may be a maximum overflow space plus the original storage space size, or may be obtained by adding a certain redundancy size to the maximum overflow space plus the original storage space size. For example, if the storage space size of the device category is 100 MB and the maximum overflow space is 20 MB, the storage space can be expanded to 120 MB, or a redundancy of 20% can be added to 20 MB, and the storage space is expanded to: 100+20*120%=124 MB.

For the stack overflow statistical information, the stack can be expanded by a certain space according to the stack overflow address, and the obtained analysis result may be increasing the size of the stack and the amplitude of the increase.

For the memory overrun statistical information, the memory space can be increased according to a relevant start address of a memory overrun, and the obtained analysis result can be increasing the size of the memory and the amplitude of the increase.

In sub-step S13, the analysis results belonging to the same device category can be combined to generate a resource optimization solution.

After the analysis results of each type of resource statistical information of the same device category are obtained, the resource optimization solution can be generated by combining the analysis results. For example, after the analysis result of the stack statistical information, the analysis result of the memory statistical information, the analysis result of the stack overflow statistical information, and the analysis result of the memory overrun statistical information of the same device category can be obtained. The above-mentioned four analysis results can be combined to generate a resource optimization solution including four analysis results, and the resource optimization solution can be used for resource optimization of the device.

In embodiments of the disclosure, the method may further include the following step: providing the resource optimization solution. After the server obtains the resource optimization solution, the resource optimization solution can be provided.

In some embodiments of the disclosure, the step of providing the resource optimization solution can include the sub-step of providing the resource optimization solution to an optimizer in an easy-to-read form. The resource optimization solution can be provided to the optimizer, and the optimizer can analyze the resource optimization solution, perform code optimization, and submit the optimized code to a code library. In some embodiments, the above easy-to-read form can be a report.

In some embodiments of the disclosure, the step of providing the resource optimization solution can further include the following sub-step: providing the resource optimization solution to an automatic processing program in an easy-to-automate form. In some embodiments, in addition to the above manual processing manner, the resource optimization solution may also be provided in an automated manner. For example, the resource optimization solution can be provided to an automatic processing script program in an easy-to-automate manner, and the automatic processing script program automatically performs code optimization according to the resource optimization solution, and submits the optimized code to the code library. As an example, the optimized code may be code of a release version, e.g., upgrade codes. Subsequently, the code of the release version can be compiled by a compiling server to generate a compiled result (e.g., upgrade information), which can be submitted to a Firmware Over-the-Air (FOTA) upgrade server. And the FOTA server can upgrade and update a related device according to the upgrade information.

In embodiments of the disclosure, the server can receive resource statistical information of a large number of devices, trigger data analysis when the data reaches a certain time and a certain scale, generate a resource optimization solution, and provide the resource optimization solution to implement automatic resource optimization analysis, thus improving the analysis efficiency and the accuracy of optimization analysis.

Figure 2:
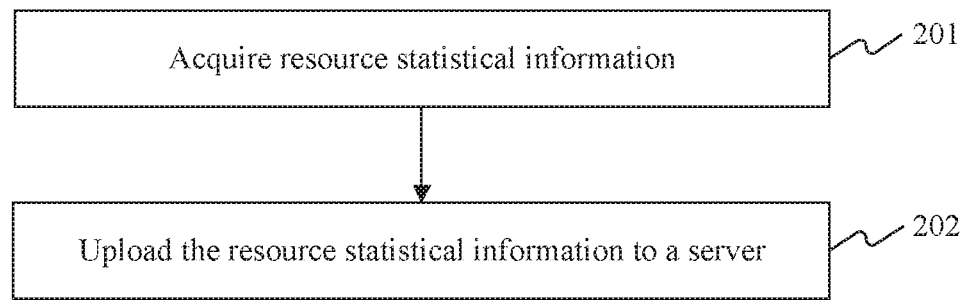
FIG. 2 is a flowchart of a resource optimization method, according to some embodiments of the disclosure.

FIG. 2 is a flowchart of a resource optimization method 200, according to some embodiments of the disclosure. Method 200 can be implemented by a computing device (e.g., a terminal device). The computing device can include a memory storing a set of instructions and at least one processor configured to execute the set of instructions to cause the computing device to perform method 200, and method 200 can include steps as follows.

In step 201, resource statistical information can be acquired.

In embodiments of the disclosure, the computing device can be installed with an RTOS, and the device can use the data processing capability provided by the RTOS to obtain the resource statistical information.

A plurality of devices can be used to collect resource statistical information, which is beneficial to data diversity, provides a foundation of abundant data for subsequent resource optimization analysis, and improves the accuracy of resource optimization analysis.

In some embodiments, the resource optimization can include size optimization of the storage space, overflow processing of the storage space, and the like. As an example, the resource statistical information can include storage space statistical information, storage space overflow statistical information, and the like.

In some embodiments of the disclosure, if the resource statistical information is storage space statistical information, step 201 can include the following sub-step: calling an interface provided by a testing and evaluation tool in an RTOS, and performing storage space detection on a storage space of the device to obtain the storage space statistical information. As an example, the storage space can include a stack, a memory, and the like. A stack is part of the memory and is associated with a task. The storage space statistical information can include stack statistical information, memory statistical information, and the like.

In some embodiments, the stack space or the memory space can be obtained by calling the interface provided by the testing and evaluation tool in the RTOS to obtain stack statistical information or memory statistical information. For example, the testing and evaluation tool can include a profile tool. As an example, the stack statistical information can include a task name associated with the stack, a stack size, a size of a used space of the stack, a proportion of the remaining size or used size of the stack, a statistical information time, and the like.

The memory statistical information can include a task name, a memory size, a size of a used space of the memory, a proportion of the remaining size or used size of the memory, a statistical information time, and the like.

In some embodiments, if the resource statistical information is storage space overflow statistical information, the storage space overflow statistical information may include stack overflow statistical information, memory overrun statistical information, and the like.

A stack overflow detection feature provided by a kernel of the RTOS can be used for stack overflow detection to obtain the stack overflow statistical information. A memory check feature provided by the kernel of the RTOS can be used for Out of Memory detection to obtain the Out of Memory statistical information. The out of memory can also be referred to as memory overrun. The stack overflow statistical information can include an identifier of a called stack, a task name to which the stack belongs, a start address of the task associated with the stack, a stack overflow address, a statistical information time, and the like.

The memory overrun statistical information can include a task name of a task, memory information to which the task belongs, a related start address of a memory overrun, a statistical information time, and the like.

In some embodiments, if the resource statistical information is storage space overflow statistical information, step 201 may include the following sub-steps: acquiring a tail address of the storage space; using a memory protection unit to set an access right of the tail address; when an access operation on the tail address is detected, determining that the storage space overflows, and triggering a memory access interrupt by the memory protection unit; and acquiring context information corresponding to the overflow as the storage space overflows statistical information.

In some embodiments, the RTOS system can acquire storage space information of the storage space. As an example, the storage space information can include a start address of the storage space, a storage space size, a storage space name, a task name, and the like. For example, if the storage space is a task stack, the stack information of the task stack can be acquired in the following manner: if it is detected that a pointer of the task scheduled by the system changes, it can be determined that the task stack is switched at this time. In this case, a data structure of the switched task can be obtained according to a pointer address of the switched task, and the stack information is obtained from the data structure. After the storage space information is obtained, a start address and a storage space size of the corresponding storage space may be obtained from the storage space information, and a tail address of the storage space is obtained according to the "start address+storage space size of the storage space."

In some embodiments of the disclosure, after the tail address of the storage space is obtained, a memory protection unit (MPU) may be used to set the access right of the tail address to protect the edge of the storage space growth direction. For example, the MPU protection may be set for the memory space corresponding to the tail address, and the access right of the tail address is set in the MPU. The access right may include: disabling reading or disabling writing or disabling code execution, and the like. Alternatively, the access right can be set to disable all access operations.

When an access operation on the tail address is detected, it can be determined that the storage space has a stack overflow. In some embodiments, because the access right of the tail of the storage space has been restricted, when the tail is read or written or executed, the storage space overflow can be determined. When an access operation on the tail address of the storage space is detected, an abnormal interrupt of the memory access can be triggered immediately. Then, the RTOS system can execute an interrupt exception handler for memory access exception processing, and during the memory access exception processing, context information may be printed as the storage space overflow statistical information.

In some embodiments of the disclosure, the tail address of the storage space can be protected by the MPU, and operations such as reading or writing or execution can be disabled. The memory access interrupt is triggered immediately when a stack overflow occurs in the system code, the timeliness of storage space overflow detection is improved effectively by hardware interrupt, and occasional problems such as stack overflows and memory overruns are found timely, thereby shortening the troubleshooting time of the overflow problem and improving the optimization effect.

In step 202, the resource statistical information can be uploaded to a server. In some embodiments, a communication channel between each device and the server may be established, and the devices may upload the resource statistical information to the server through respective communication channels. The communication channel can include a dedicated data acquisition channel.

In some embodiments of the disclosure, step 202 may include the following sub-steps.

In sub-step S21, device category information of the device can be further acquired. Acquiring the device category information of the device can further include sub-steps S211-S213.

In sub-step S211, a model of the device is acquired.

In sub-step S212, a version number of the RTOS installed in the device is acquired.

In sub-step S213, the model and the version number are organized into the device category information of the device.

The device category information may be used to reflect the category of the device, and can include a model of the device, a version number of the RTOS installed in the device, and the like. For example, the model of the device may be obtained first, then the version number of the RTOS installed by the device is obtained, and the model and the version number are combined into the device category information.

In sub-step S22, attribute category information of the resource statistical information is determined. The attribute category information may be used to reflect the category of the resource statistical information. Each type of resource statistical information has corresponding attribute category information, which can include a storage space detection category, a storage space overflow detection category, and the like. The storage space detection category corresponds to the detection of the storage space statistical information, and the storage space overflow detection category corresponds to the detection of the storage space overflow statistical information. In some embodiments, each type of attribute category information has a category identifier.

In sub-step S23, the resource statistical information as well as the corresponding device category information and attribute category information can be uploaded to the server. In some embodiments, the device category information of the device and the attribute category information of each type of resource statistical information may also be carried when the device sends the resource statistical information to the server, so that the server can perform resource optimization analysis for resource statistical information of each type of attribute category corresponding to each device category according to the device category information and the attribute category information, to generate a resource optimization solution for resource optimization of the device. After obtaining the resource optimization solution, the server may provide the resource optimization solution to an optimizer or an automated scripting tool, and the optimizer or the automated scripting tool performs code optimization according to the resource optimization solution, and obtains the upgrade code. The upgrade code is compiled by a compiling server to obtain upgrade information. The upgrade information is sent to an upgrade server, and the upgrade server sends an upgrade notification to a corresponding device according to the upgrade information to optimize resources of the related device. After receiving the upgrade notification, the device can display the upgrade notification to a user. After a confirmation operation of the user is detected, resources of the device are optimized.

In some embodiments of the disclosure, the device collects resource statistical information according to the characteristics provided by the RTOS of the device, so that the collected data is more accurate and timelier. The resource statistical information is transmitted to the server through the channel formed previously. The data is analyzed by the server to obtain the resource optimization solution, thereby realizing automatic resource optimization analysis, improving the analysis efficiency, and improving the accuracy of the optimization analysis.

It should be noted that for ease of description, the method embodiments are all described as a series of action combinations. However, those skilled in the art should know that embodiments of the disclosure are not limited to the described sequence of the actions, because some steps may be performed in another sequence or at the same time according to some embodiments of the disclosure. In addition, those skilled in the art should also know that the embodiments described in this specification all belong to preferred embodiments, and the actions involved are not necessarily mandatory to embodiments of the disclosure.

Figure 3:
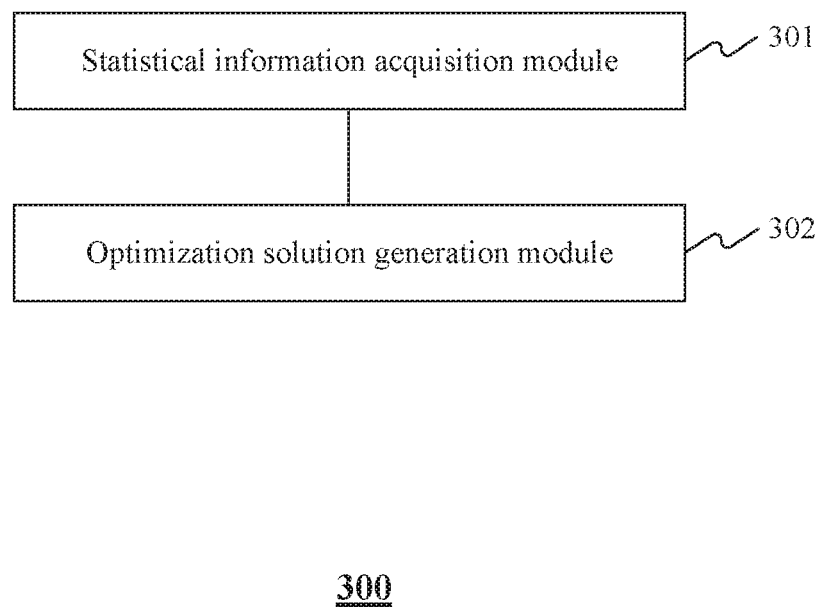
FIG. 3 illustrates a structural diagram of a resource optimization server, according to some embodiments of the disclosure.

FIG. 3 illustrates a structural diagram of a resource optimization server 300, according to some embodiments of the disclosure. Server 300 may include modules as follows.

A statistical information acquisition module 301 can be configured to acquire resource statistical information for a plurality of devices.

An optimization solution generation module 302 can be configured to generate a resource optimization solution for resource optimization of the devices by using the resource statistical information when a preset trigger condition is met.

In some embodiments of the disclosure, device category information or attribute category information are/is carried in the resource statistical information. Optimization solution generation module 302 may further include: an information extraction sub-module configured to extract resource statistical information belonging to the same device category information and the same attribute category information when the preset trigger condition is met; an analysis result acquisition sub-module configured to perform resource optimization analysis on the extracted resource statistical information to obtain an analysis result; and an optimization solution generation sub-module configured to generate a resource optimization solution by combining all analysis results belonging to the same device category.

In some embodiments of the disclosure, the attribute category information can include a storage space detection category. Resource statistical information corresponding to the storage space detection category can include storage space statistical information. And the storage space statistical information can include a task name, a storage space size, and a used space size.

The analysis result acquisition sub-module can include: a maximum value determining unit configured to extract a maximum used space size based on the storage space statistical information and from used space sizes belonging to the same device category information and used by all the devices to perform the same task for the same storage space; a comparing unit configured to compare the maximum used space size of the storage space with the size of the storage space; and a storage space adjusting unit configured to adjust the size of the storage space according to the comparison result.

In some embodiments of the disclosure, the storage space adjusting unit is further configured to: calculate a ratio of the maximum used space size to the size of the storage space to obtain a maximum usage rate; if the maximum usage rate is less than a preset usage rate threshold, increase the maximum usage rate by a preset redundancy usage rate to obtain an updated usage rate; and determine an updated size of the storage space based on the updated usage rate and the size of the storage space.

In some embodiments of the disclosure, the attribute category information includes a storage space overflow detection category, and resource statistical information corresponding to the storage space overflow detection category includes storage space overflow statistical information; the storage space overflow statistical information includes a task name, an identifier of a storage space to which the task name belongs, and a start address of a storage space overflow.

The analysis result acquisition sub-module can further include: an overflow space maximum value determining unit configured to acquire, based on the storage space overflow statistical information, an overflow space size belonging to the same device category information and for the same storage space when each of the devices performs the same task, and select a maximum overflow space from various overflow space sizes; and a storage space expanding unit configured to expand the size of the storage space according to the maximum overflow space.

In some embodiments of the disclosure, the storage space can include a stack or a memory, and the storage space statistical information includes stack statistical information or memory statistical information. And the storage space overflow statistical information can include stack overflow statistical information or memory overrun statistical information.

In some embodiments of the disclosure, the trigger condition can include at least one of the quantity of the collected resource statistical information reaching a preset quantity threshold, the size of the collected resource statistical information reaching a preset data size threshold, and the collection time for the collected resource statistical information reaching a time threshold.

In some embodiments of the disclosure, the server can further include: an optimization solution providing module configured to provide the resource optimization solution.

In some embodiments of the disclosure, the optimization solution providing module is further configured to: provide the resource optimization solution to an optimizer in an easy-to-read form; or provide the resource optimization solution to an automatic processing program in an easy-to-automate form.

Figure 4:
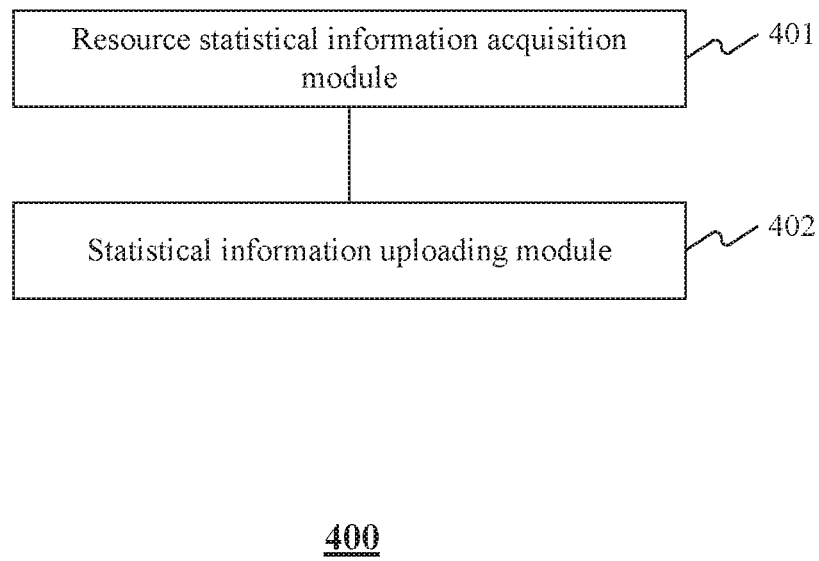
FIG. 4 illustrates a structural diagram of a resource optimization device, according to some embodiments of the disclosure.

FIG. 4 illustrates a structural diagram of a resource optimization device 400, according to some embodiments of the disclosure. Device 400 can further include modules as follows.

A resource statistical information acquisition module 401 can be configured to acquire resource statistical information.

A statistical information uploading module 402 can be configured to upload the resource statistical information to a server, the server being configured to generate a resource optimization solution for resource optimization of the device by using the resource statistical information.

In some embodiments of the disclosure, the resource statistical information includes storage space statistical information, and the resource statistical information acquisition module 401 can include: a storage space statistical information acquisition sub-module configured to call an interface provided by a testing and evaluation tool in an RTOS, and perform storage space detection on a storage space to obtain the storage space statistical information.

In some embodiments of the disclosure, the resource statistical information includes storage space overflow statistical information, and the resource statistical information acquisition module 401 can include: a tail address acquisition sub-module configured to acquire a tail address of the storage space; an access right setting sub-module configured to set an access right of the tail address using a memory protection unit; an interrupting sub-module configured to determine that an overflow occurs in the storage space when an access operation on the tail address is detected, and trigger a memory access interrupt by the memory protection unit; and an overflow statistical information acquisition sub-module configured to acquire context information corresponding to the overflow as the storage space overflow statistical information.

In some embodiments of the disclosure, the resource statistical information uploading module 402 can include: a device category acquisition sub-module configured to acquire device category information of the device; an attribute category determining sub-module configured to determine attribute category information of the resource statistical information; and an information uploading sub-module configured to upload the resource statistical information as well as the corresponding device category information and attribute category information to the server.

In some embodiments of the disclosure, the device category acquisition sub-module is further configured to: acquire a model of the device; acquire a version number of the RTOS installed in the device; and organize the model and the version number into the device category information of the device.

In some embodiments of the disclosure, the storage space includes a stack or a memory, and the storage space statistical information includes stack statistical information or memory statistical information; and the storage space overflow statistical information includes stack overflow statistical information or memory overrun statistical information.

The server and device embodiments are described in a relatively simple manner because they are basically similar to the method embodiment, and for related parts, reference can be made to the parts described in the method embodiment.

A resource update method applied to a server side is further disclosed in embodiments of the disclosure. The method includes: acquiring resource statistical information for a plurality of devices; and generating a resource optimization solution for resource optimization of the devices by using the resource statistical information when a preset trigger condition is met.

This embodiment is described in a relatively simple manner because it is basically similar to the method embodiment in FIG. 1, and for related parts, reference can be made to the parts described in the method embodiment, which will not be repeated here.

A resource update method applied to a device side is further disclosed in embodiments of the disclosure. The method includes: acquiring resource statistical information; and uploading the resource statistical information to a server, the server being configured to generate a resource update solution for resource update of the device by using the resource statistical information.

This embodiment is described in a relatively simple manner because it is basically similar to the method embodiment in FIG. 2, and for related parts, reference can be made to the parts described in the method embodiment, which will not be repeated here.

A server is further disclosed in embodiments of the disclosure, the server including: a statistical information acquisition module configured to acquire resource statistical information for a plurality of devices; and a resource update solution generation module configured to generate a resource update solution for resource update of the devices by using the resource statistical information when a preset trigger condition is met.

A device is further disclosed in embodiments of the disclosure, the device including: a statistical information acquisition module configured to acquire resource statistical information; and a statistical information uploading module configured to upload the resource statistical information to a server, the server being configured to generate a resource update solution for resource update of the device by using the resource statistical information.

The above embodiment is described in a relatively simple manner because it is basically similar to the method embodiments in FIG. 3 and FIG. 4, and for related parts, reference can be made to the parts described in the method embodiments, which will not be repeated here.

Figure 5:
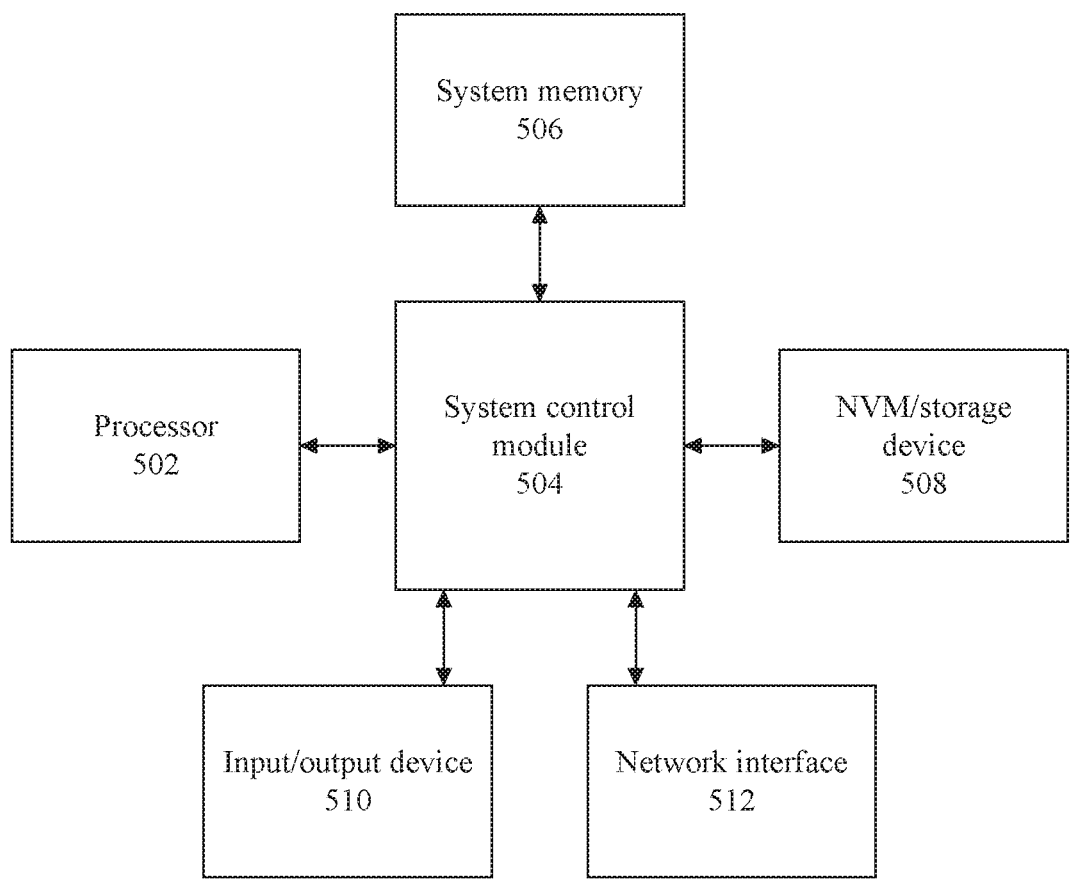
FIG. 5 illustrates a schematic diagram of an exemplary system, according to some embodiments of the disclosure.

Embodiments of this disclosure can be implemented as a system for performing a desired configuration using any suitable hardware, firmware, software, or any combination thereof. FIG. 5 illustrates a schematic diagram of an exemplary system 500, according to some embodiments of the disclosure.

System 500 can include one or more processors 502, a system control module (e.g., a chipset) 504 coupled to the one or more processors 502, a system memory 506 coupled to the system control module 504, a non-volatile memory (NVM)/storage device 508 coupled to the system control module 504, one or more input/output devices 510 coupled to the system control module 504, and a network interface 512 coupled to the system control module 506.

Processor 502 may include one or more single-core or multi-core processors, and processor 502 may include any combination of general-purpose or special-purpose processors (such as a graphics processor, an application processor, an NPU accelerator, and a baseband processor). In some embodiments, system 500 can function as a browser as described in embodiments of the disclosure.

In some embodiments, system 500 may include and be integrated with one or more computer readable media (e.g., system memory 506 or NVM/storage device 508) having instructions, and may be configured to execute the instructions to implement one or more processors 502 that perform the actions described in this disclosure. As an example, system control module 504 may include any suitable interface controller to provide any suitable interface to the one or more processors 502 or any suitable device or component in communication with system control module 504. System control module 504 may include a memory controller module to provide an interface to system memory 506. The memory controller module may be a hardware module, a software module, or a firmware module.

System memory 506 may be configured to, for example, load and store data or instructions for system 500. For one embodiment, system memory 506 may include any suitable volatile memory, such as a suitable DRAM. In some embodiments, the system memory 506 may include a double-data-rate type quad synchronous dynamic random access memory (DDR5SDRAM).

In some embodiments, system control module 504 may include one or more input/output controllers to provide an interface to NVM/storage device 508 and one or more input/output devices 510. For example, NVM/storage device 508 can be configured to store data or instructions. NVM/storage device 508 may include any suitable non-volatile memory (such as a flash memory) or may include any suitable (one or more) non-volatile storage devices (such as one or more hard disk drives (HDDs), one or more compact disc (CD) drives or one or more digital versatile disc (DVD) drives). NVM/storage device 508 may include storage resources that are physically part of the device on which system 500 is installed, or that can be accessed by the device without having to be part of the device. For example, NVM/storage device 508 can be accessed over the network via one or more input/output devices 510.

One or more input/output devices 510 can provide an interface to system 500 to communicate with any other suitable device, and input/output device 510 may include a communication component, an audio component, a sensor component, and the like. Network interface 512 can provide an interface for system 500 to communicate over one or more networks, and system 500 can communicate with one or more of the wireless networks wirelessly in accordance with any of the one or more wireless network standards or protocols, e.g., by accessing a wireless network based on a communication standard, such as WiFi, 2G or 3G, or a combination thereof. As an example, at least one of one or more processors 502 can be packaged with logic of one or more controllers (e.g., the memory controller module) of system control module 504. For one embodiment, at least one of one or more processors 502 can be packaged with the logic of one or more controllers of system control module 504 to form a system in package (SiP). For one embodiment, at least one of one or more processors 502 can be integrated with the logic of one or more controllers of the system control module 504 on the same mold. For one embodiment, at least one of one or more processors 502 can be integrated with the logic of one or more controllers of system control module 504 on the same mold to form a system on chip (SoC).

In various embodiments, system 500 may be, but is not limited to, a browser, a workstation, a desktop computing device, or a mobile computing device (such as a laptop computing device, a handheld computing device, a tablet, and a netbook). In various embodiments, system 500 may have more or fewer components or different architectures. For example, in some embodiments, system 500 includes one or more cameras, a keyboard, a liquid crystal display (LCD) screen (including a touch screen display), a non-volatile memory port, a plurality of antennas, a graphics chip, an application specific integrated circuit (ASIC), and a speaker.

If the display includes a touch panel, the display screen can be implemented as a touch screen display to receive an input signal from a user. The touch panel includes one or more touch sensors to sense touches, slides, and gestures on the touch panel. The touch sensors not only can sense boundaries of a touching or sliding movement, but also can detect duration and pressure associated with the touching or sliding operation.

The various embodiments in this specification are described in a progressive manner, and each embodiment focuses on a difference from other embodiments. For identical or similar parts between the various embodiments, reference can be made to each other.

Those skilled in the art should understand that some embodiments of the disclosure may be provided as a method, an apparatus, or a computer program product. Therefore, embodiments of the disclosure may be implemented in a form of a complete hardware embodiment, a complete software embodiment, or an embodiment combining software and hardware. Moreover, embodiments of the disclosure may be in the form of a computer program product implemented on one or more computer usable storage media (including, but not limited to, a magnetic disk memory, a CD-ROM, an optical memory and the like) including computer usable program codes.

Embodiments of the disclosure are described with reference to flowcharts or block diagrams of the method, the device (system) and the computer program product according to some embodiments of the disclosure. It should be understood that a computer program instruction may be used to implement each process or block in the flowcharts or block diagrams and combinations of processes or blocks in the flowcharts or block diagrams. These computer program instructions may be provided to a general-purpose computer, a special-purpose computer, an embedded processor, or a processor of another programmable data processing device to generate a machine, so that the instructions executed by the computer or the processor of another programmable data processing device generate an apparatus configured to implement a specified function in one or more processes in the flowcharts or in one or more blocks in the block diagrams.

These computer program instructions may also be stored in a computer readable memory that can guide a computer or another programmable data processing device to work in a particular manner, such that the instructions stored in the computer readable memory generate an article of manufacture that includes an instruction apparatus. The instruction apparatus implements a function specified in one or more processes in the flowcharts or in one or more blocks in the block diagrams.

These computer program instructions may also be loaded onto a computer or another programmable data processing device, such that a series of operation steps are performed on the computer or another programmable device to generate computer-implemented processing. Therefore, the instructions executed on the computer or another programmable device provide steps for implementing a function specified in one or more processes in the flowcharts or in one or more blocks in the block diagrams.

The embodiments may further be described using the following clauses.

1. A method for managing resources of a plurality of devices coupled to a server, comprising:
   acquiring statistical information of the resources of the plurality of devices;
   determining whether a trigger condition is met; and
   in response to the determination that trigger condition is met, generating a resource optimization solution for the plurality of devices based on the statistical information.

2. The method of clause 1, wherein the statistical information comprises at least one of device category information or attribute category information, and generating the resource optimization solution for the plurality of devices based on the statistical information further comprises:
   classifying the statistical information of the resources of the plurality of devices into at least one group of statistical information based on a device category and an attribute category of the plurality of devices;
   performing optimization analysis on each of the at least one group of statistical information to generate an analysis result; and generating the resource optimization solution based on the analysis result of the device category.

3. The method of clause 2, wherein the attribute category further comprises a storage space detection category, and statistical information associated with the storage space detection category comprises storage space statistical information, the storage space statistical information comprises at least one of a task name, a storage space size, or a used space size; and performing the optimization analysis on each of the at least one group of statistical information to generate the analysis result further comprises:
   determining a plurality of used space sizes of devices in a same storage space detection category;
   determining, among the plurality of used space sizes, a maximum used space size in a same device category performing a same task in a storage space; and
   adjusting a size of the storage space based on the maximum used space size.

4. The method of clause 3, wherein adjusting the size of the storage space based on the maximum used space size further comprises:
   determining a ratio of the maximum used space size to the size of the storage space to obtain a maximum usage rate;
   if the maximum usage rate is less than a usage rate threshold, increasing the maximum usage rate by a redundancy usage rate to generate an updated usage rate; and
   determining an updated size of the storage space based on the updated usage rate and the size of the storage space.

5. The method of clause 3 or 4, wherein the attribute category further comprises a storage space overflow detection category, and statistical information associated with the storage space overflow detection category further comprises storage space overflow statistical information, the storage space overflow statistical information comprises at least one of a task name of a task, an identifier of a storage space associated with the task, and a start address of a storage space overflow, and performing the optimization analysis on each of the at least one group of statistical information to generate the analysis result further comprises:
   obtaining, based on the storage space overflow statistical information, a plurality of overflow space sizes of devices in a same device category;
   determining, among the plurality of overflow space sizes, a maximum overflow space size in a same device category performing a same task in a storage space; and
   expanding a size of the storage space according to the maximum overflow space size.

6. The method of clause 5, wherein the storage space comprises a stack, and the storage space statistical information comprises stack statistical information, and the storage space overflow statistical information comprises stack overflow statistical information.

7. The method of any one of clauses 1-4, wherein the trigger condition comprises at least one of: a size of the collected statistical information reaching a quantity threshold, a size of the collected statistical information reaching a preset data size threshold, or a collection time for the collected statistical information reaching a time threshold.

8. The method of clause 1, further comprising: providing the resource optimization solution.

9. The method of clause 8, wherein providing the resource optimization solution further comprises:
   providing the resource optimization solution to an optimizer in an easy-to-read form; or
   providing the resource optimization solution to an automatic processing program in an easy-to-automate form.

10. A method for managing resources of a device, comprising:
    acquiring statistical information of the device; and
    uploading the statistical information to a server, the server being configured to generate a resource optimization solution for managing the resources of the device based on the statistical information.

11. The method of clause 10, wherein the statistical information comprises storage space statistical information, and acquiring the statistical information of the device further comprises:
    calling an interface of an operating system; and
    performing storage space detection on a storage space of the device to obtain the storage space statistical information.

12. The method of clause 11, wherein the statistical information comprises storage space overflow statistical information, and acquiring the statistical information of the device further comprises:
    acquiring a tail address of a storage space;
    setting an access right of the tail address using a memory protection unit;
    determining whether an access operation on the tail address is detected;
    in response to the determination that the access operation on the tail address is detected, determining that an overflow occurs in the storage space and triggering a memory access interrupt by the memory protection unit; and
    acquiring context information corresponding to the overflow as the storage space overflow statistical information.

13. The method of clause 12, wherein uploading the statistical information to the server further comprises:
- acquiring device category information of the device;
- determining attribute category information of the statistical information; and
- uploading to the server the statistical information and the device category information and the attribute category information associated with the statistical information.

14. The method of clause 13, wherein acquiring the device category information of the device comprises:
- acquiring a model of the device;
- acquiring a version of the operating system in the device; and
- generating the device category information of the device based on the model and the version.

15. The method of clause 12, wherein the storage space comprises at least one of a stack or a memory, and the storage space statistical information comprises at least one of stack statistical information or memory statistical information, and the storage space overflow statistical information comprises at least one of stack overflow statistical information or memory overrun statistical information.

16. A server for managing resources of a plurality of devices coupled to the server, comprising:
- a memory storing a set of instructions; and
- at least one processor configured to execute the set of instructions to cause the server to perform:
- acquiring statistical information of the resources of the plurality of devices;
- determining whether a trigger condition is met; and
- in response to the determination that trigger condition is met, generating a resource optimization solution for the plurality of devices based on the statistical information.

17. The server of clause 16, wherein the statistical information comprises at least one of device category information or attribute category information, and generating the resource optimization solution for the plurality of devices based on the statistical information further comprises:
- classifying the statistical information of the resources of the plurality of devices into at least one group of statistical information based on a device category and an attribute category of the plurality of devices;
- performing optimization analysis on each of the at least one group of statistical information to generate an analysis result; and
- generating the resource optimization solution based on the analysis result of the device category.

18. The server of clause 17, wherein the attribute category further comprises a storage space detection category, and statistical information associated with the storage space detection category comprises storage space statistical information, the storage space statistical information comprises at least one of a task name, a storage space size, or a used space size; and performing the optimization analysis on each of the at least one group of statistical information to generate the analysis result further comprises:
- determining a plurality of used space sizes of devices in a same storage space detection category;
- determining, among the plurality of used space sizes, a maximum used space size in a same device category performing a same task in a storage space; and
- adjusting a size of the storage space based on the maximum used space size.

19. The server of clause 18, wherein adjusting the size of the storage space based on the maximum used space size further comprises:
- determining a ratio of the maximum used space size to the size of the storage space to obtain a maximum usage rate;
- if the maximum usage rate is less than a usage rate threshold, increasing the maximum usage rate by a redundancy usage rate to generate an updated usage rate; and
- determining an updated size of the storage space based on the updated usage rate and the size of the storage space.

20. The server of clause 18 or 19, wherein the attribute category further comprises a storage space overflow detection category, and statistical information associated with the storage space overflow detection category further comprises storage space overflow statistical information, the storage space overflow statistical information comprises at least one of a task name of a task, an identifier of a storage space associated with the task, and a start address of a storage space overflow, and performing the optimization analysis on each of the at least one group of statistical information to generate the analysis result further comprises:
- obtaining, based on the storage space overflow statistical information, a plurality of overflow space sizes of devices in a same device category;
- determining, among the plurality of overflow space sizes, a maximum overflow space size in a same device category performing a same task in a storage space; and
- expanding a size of the storage space according to the maximum overflow space size.

21. The server of clause 20, wherein the storage space comprises a stack, and the storage space statistical information comprises stack statistical information, and the storage space overflow statistical information comprises stack overflow statistical information.

22. The server of any one of clauses 16-19, wherein the trigger condition comprises at least one of: a size of the collected statistical information reaching a quantity threshold, a size of the collected statistical information reaching a preset data size threshold, or a collection time for the collected statistical information reaching a time threshold.

23. The server of clause 16, further comprising: providing the resource optimization solution.

24. The server of clause 23, wherein providing the resource optimization solution further comprises:
- providing the resource optimization solution to an optimizer in an easy-to-read form; or
- providing the resource optimization solution to an automatic processing program in an easy-to-automate form.

25. A device for managing resources of the device, comprising:
- a memory storing a set of instructions; and
- at least one processor configured to execute the set of instructions to cause the device to perform:
- acquiring statistical information of the device; and
- uploading the statistical information to a server, the server being configured to generate a resource optimization solution for managing the resources of the device based on the statistical information.

26. The device of clause 25, wherein the statistical information comprises storage space statistical information, and acquiring the statistical information of the device further comprises:
- calling an interface of an operating system; and
- performing storage space detection on a storage space of the device to obtain the storage space statistical information.

27. The device of clause 26, wherein the statistical information comprises storage space overflow statistical information, and acquiring the statistical information of the device further comprises:
   acquiring a tail address of a storage space;
   setting an access right of the tail address using a memory protection unit;
   determining whether an access operation on the tail address is detected;
   in response to the determination that the access operation on the tail address is detected, determining that an overflow occurs in the storage space and triggering a memory access interrupt by the memory protection unit; and
   acquiring context information corresponding to the overflow as the storage space overflow statistical information.

28. The device of clause 27, wherein uploading the statistical information to the server further comprises:
   acquiring device category information of the device;
   determining attribute category information of the statistical information; and
   uploading to the server the statistical information and the device category information and the attribute category information associated with the statistical information.

29. The device of clause 28, wherein acquiring the device category information of the device comprises:
   acquiring a model of the device;
   acquiring a version of the operating system in the device; and
   generating the device category information of the device based on the model and the version.

30. The device of clause 27, wherein the storage space comprises at least one of a stack or a memory, and the storage space statistical information comprises at least one of stack statistical information or memory statistical information, and the storage space overflow statistical information comprises at least one of stack overflow statistical information or memory overrun statistical information.

31. A non-transitory computer readable medium that stores a set of instructions that is executable by at least one processor of a server to cause the server to perform a method for managing resources of a plurality of devices coupled to the server, the method comprising:
   acquiring statistical information of the resources of the plurality of devices;
   determining whether a trigger condition is met; and
   in response to the determination that trigger condition is met, generating a resource optimization solution for the plurality of devices based on the statistical information.

32. A non-transitory computer readable medium that stores a set of instructions that is executable by at least one processor of a computing device to cause the computing device to perform a method for managing resources of the computing device, the method comprising:
   acquiring statistical information of the device; and
   uploading the statistical information to a server, the server being configured to generate a resource optimization solution for managing the resources of the device based on the statistical information.

Finally, it should be further noted that in this text, the relation terms such as "first" and "second" are merely used to distinguish one entity or operation from another entity or operation, and do not require or imply that the entities or operations have this actual relation or order. Moreover, the terms "include," "comprise" or any other variations thereof are intended to cover non-exclusive inclusion, so that a process, method, article or device including a series of elements not only includes the elements, but also includes other elements not clearly listed, or further includes elements inherent to the process, method, article or device. In the absence of more limitations, an element defined by "including a/an . . . " does not exclude that the process, method, article or device including the element further has other identical elements.

An IoT-based resource optimization and update method, server, and device provided in this application are described in detail above, and the principles and implementation manners of this application are described with specific examples in this text. The above description of the embodiments is merely used to help understand the method of this application and its core ideas. Meanwhile, for those of ordinary skill in the art, there may be modifications to the specific implementation manners and application scopes according to the idea of this application. Therefore, the content of the specification should not be construed as limitations to this application.

What is claimed is:

1. A method for managing resources of a plurality of devices coupled to a server, comprising:
   acquiring statistical information of the resources of the plurality of devices;
   determining whether a trigger condition is met; and
   in response to the determination that trigger condition is met, generating a resource optimization solution for the plurality of devices based on the statistical information;
   wherein generating the resource optimization solution for the plurality of devices based on the statistical information comprises:
      determining used space sizes of an allocated storage space of a first group of the devices, wherein the first group of the devices belong to a device category among device categories of the plurality of devices, the first group of the devices perform a task, and the allocated storage is allocated for the task to occupy in each of the first group of the devices;
      determining a maximum used space size among the used space sizes of the first group of the devices; and
      adjusting a size of the allocated storage space for each of the first group of the devices based on the maximum used space size.

2. The method of claim 1, wherein the statistical information comprises at least one of device category information or attribute category information, and generating the resource optimization solution for the plurality of devices based on the statistical information further comprises:
   classifying the statistical information of the resources of the plurality of devices into at least one group of statistical information based on a device category and an attribute category of the plurality of devices;
   performing optimization analysis on each of the at least one group of statistical information to generate an analysis result; and
   generating the resource optimization solution based on the analysis result of the device category.

3. The method of claim 2, wherein the attribute category further comprises a storage space detection category, and statistical information associated with the storage space detection category comprises storage space statistical information, the storage space statistical information comprises at least one of a task name, a storage space size, or a used space size; and performing the optimization analysis on each of the at least one group of statistical information to generate the analysis result further comprises:

determining a plurality of used space sizes of devices in a same storage space detection category;

determining, among the plurality of used space sizes, a maximum used space size in a same device category performing a task in a storage space; and adjusting a size of the storage space based on the maximum used space size.

4. The method of claim 3, wherein adjusting the size of the storage space based on the maximum used space size further comprises:

determining a ratio of the maximum used space size to the size of the storage space to obtain a maximum usage rate;

if the maximum usage rate is less than a usage rate threshold, increasing the maximum usage rate by a redundancy usage rate to generate an updated usage rate; and determining an updated size of the storage space based on the updated usage rate and the size of the storage space.

5. The method of claim 3, wherein the attribute category further comprises a storage space overflow detection category, and statistical information associated with the storage space overflow detection category further comprises storage space overflow statistical information, the storage space overflow statistical information comprises at least one of a task name of a task, an identifier of a storage space associated with the task, and a start address of a storage space overflow, and performing the optimization analysis on each of the at least one group of statistical information to generate the analysis result further comprises:

obtaining, based on the storage space overflow statistical information, a plurality of overflow space sizes of devices in a same device category;

determining, among the plurality of overflow space sizes, a maximum overflow space size in a same device category performing a task in a storage space; and expanding a size of the storage space according to the maximum overflow space size.

6. The method of claim 5, wherein the storage space comprises a stack, and the storage space statistical information comprises stack statistical information, and the storage space overflow statistical information comprises stack overflow statistical information.

7. The method of claim 1, wherein the trigger condition comprises at least one of: a size of the collected statistical information reaching a quantity threshold, a size of the collected statistical information reaching a preset data size threshold, or a collection time for the collected statistical information reaching a time threshold.

8. The method of claim 1, further comprising: providing the resource optimization solution, wherein providing the resource optimization solution further comprises:

providing the resource optimization solution to an optimizer in an easy-to-read form; or providing the resource optimization solution to an automatic processing program in an easy-to-automate form.

9. A server for managing resources of a plurality of devices coupled to the server, comprising:

a memory storing a set of instructions; and at least one processor configured to execute the set of instructions to cause the server to perform:

acquiring statistical information of the resources of the plurality of devices;

determining whether a trigger condition is met; and in response to the determination that trigger condition is met, generating a resource optimization solution for the plurality of devices based on the statistical information;

wherein generating the resource optimization solution for the plurality of devices based on the statistical information comprises:

determining used space sizes of an allocated storage space of a first group of the devices, wherein the first group of the devices belong to a device category among device categories of the plurality of devices, the first group of the devices perform a task, and the allocated storage is allocated for the task to occupy in each of the first group of the devices;

determining a maximum used space size among the used space sizes of the first group of the devices; and adjusting a size of the allocated storage space for each of the first group of the devices based on the maximum used space size.

10. The server of claim 9, wherein the statistical information comprises at least one of device category information or attribute category information, and generating the resource optimization solution for the plurality of devices based on the statistical information further comprises:

classifying the statistical information of the resources of the plurality of devices into at least one group of statistical information based on a device category and an attribute category of the plurality of devices;

performing optimization analysis on each of the at least one group of statistical information to generate an analysis result; and generating the resource optimization solution based on the analysis result of the device category.

11. The server of claim 10, wherein the attribute category further comprises a storage space detection category, and statistical information associated with the storage space detection category comprises storage space statistical information, the storage space statistical information comprises at least one of a task name, a storage space size, or a used space size; and performing the optimization analysis on each of the at least one group of statistical information to generate the analysis result further comprises:

determining a plurality of used space sizes of devices in a same storage space detection category;

determining, among the plurality of used space sizes, a maximum used space size in a same device category performing a task in a storage space; and adjusting a size of the storage space based on the maximum used space size.

12. The server of claim 11, wherein adjusting the size of the storage space based on the maximum used space size further comprises:

determining a ratio of the maximum used space size to the size of the storage space to obtain a maximum usage rate;

if the maximum usage rate is less than a usage rate threshold, increasing the maximum usage rate by a redundancy usage rate to generate an updated usage rate; and determining an updated size of the storage space based on the updated usage rate and the size of the storage space.

13. The server of claim 11, wherein the attribute category further comprises a storage space overflow detection category, and statistical information associated with the storage space overflow detection category further comprises storage space overflow statistical information, the storage space overflow statistical information comprises at least one of a task name of a task, an identifier of a storage space associated with the task, and a start address of a storage space overflow, and performing the optimization analysis on each of the at least one group of statistical information to generate the analysis result further comprises:

obtaining, based on the storage space overflow statistical information, a plurality of overflow space sizes of devices in a same device category;

determining, among the plurality of overflow space sizes, a maximum overflow space size in a same device category performing a task in a storage space; and expanding a size of the storage space according to the maximum overflow space size.

14. The server of claim 13, wherein the storage space comprises a stack, and the storage space statistical information comprises stack statistical information, and the storage space overflow statistical information comprises stack overflow statistical information.

15. The server of claim 9, wherein the trigger condition comprises at least one of: a size of the collected statistical information reaching a quantity threshold, a size of the collected statistical information reaching a preset data size threshold, or a collection time for the collected statistical information reaching a time threshold.

16. The server of claim 9, further comprising: providing the resource optimization solution.

17. The server of claim 16, wherein providing the resource optimization solution further comprises:

providing the resource optimization solution to an optimizer in an easy-to-read form; or providing the resource optimization solution to an automatic processing program in an easy-to-automate form.

18. A non-transitory computer readable medium that stores a set of instructions that is executable by at least one processor of a server to cause the server to perform a method for managing resources of a plurality of devices coupled to the server, the method comprising:

acquiring statistical information of the resources of the plurality of devices;

determining whether a trigger condition is met; and in response to the determination that trigger condition is met, generating a resource optimization solution for the plurality of devices based on the statistical information;

wherein generating the resource optimization solution for the plurality of devices based on the statistical information comprises:

determining used space sizes of an allocated storage space of a first group of the devices, wherein the first group of the devices belong to a device category among device categories of the plurality of devices, the first group of the devices perform a task, and the allocated storage is allocated for the task to occupy in each of the first group of the devices;

determining a maximum used space size among the used space sizes of the first group of the devices; and adjusting a size of the allocated storage space for each of the first group of the devices based on the maximum used space size.

\* \* \* \* \*